United States Patent
Bennett

[11] Patent Number: 6,099,617
[45] Date of Patent: Aug. 8, 2000

[54] AIR ENVIRONMENT CONTROL SYSTEMS

[75] Inventor: Edward John Bennett, Surrey, United Kingdom

[73] Assignee: Howden Aircontrol Limited, Staines, United Kingdom

[21] Appl. No.: 09/023,662

[22] Filed: Feb. 10, 1998

[51] Int. Cl.$^7$ ................................................ B01D 53/047
[52] U.S. Cl. .................. 95/99; 95/105; 95/106; 95/116; 95/143; 96/128; 96/130; 96/144; 96/146
[58] Field of Search .......................... 95/39, 41, 97–100, 95/103–106, 116, 141, 143; 96/108, 121, 126–128, 130, 144, 146

[56] References Cited

U.S. PATENT DOCUMENTS

| | | | |
|---|---|---|---|
| 4,732,579 | 3/1988 | Veitman et al. | 96/130 X |
| 4,769,051 | 9/1988 | Defrancesco | 96/144 X |
| 4,793,832 | 12/1988 | Veitman et al. | 96/128 X |
| 5,137,548 | 8/1992 | Grenier et al. | 95/41 |
| 5,151,022 | 9/1992 | Emerson et al. | 95/39 X |
| 5,152,812 | 10/1992 | Kovach | 95/41 |
| 5,203,889 | 4/1993 | Brown | 96/130 X |
| 5,213,593 | 5/1993 | White, Jr. | 95/99 |
| 5,256,172 | 10/1993 | Keefer | 95/100 X |
| 5,298,054 | 3/1994 | Malik | 95/104 X |
| 5,403,384 | 4/1995 | Faul et al. | 95/106 X |
| 5,440,873 | 8/1995 | Toda et al. | 96/130 X |
| 5,453,112 | 9/1995 | Sinicropi et al. | 95/103 X |
| 5,647,891 | 7/1997 | Blizzard et al. | 95/99 |

*Primary Examiner*—Robert Spitzer
*Attorney, Agent, or Firm*—Fish & Richardson P.C.

[57] ABSTRACT

A method is described for providing clean air at desired temperature to an environment. Incoming air possibly contaminated with nuclear biological and chemical contaminants is compressed. The compressed air is cooled in a first heat exchanger. The cooled air from the first heat exchanger is compressed in a secondary compressor. Compressed air from the secondary compressor is cooled in a second heat exchanger. Cooled air from the secondary heat exchanger is directed through a regenerative pressure swing absorption system to provide clean output air with the contaminants removed therefrom. This cleaned air is expanded in a turbine coupled to the secondary compressor, whereby to recover energy from the cleaned air to drive the secondary compressor. The expanded cleaned air from the turbine is utilized to condition air in the environment. The regenerative pressure swing absorption system is purged with air derived from the expanded clean air. This purging air is first warmed by heat exchange either with waste heat derived from the step of compressing the incoming air or by heat exchange with clean air exiting the regenerative pressure swing absorption system.

11 Claims, 3 Drawing Sheets

AIR ENVIRONMENT CONTROL SYSTEMS

FIELD OF THE INVENTION

This invention relates to methods and apparatus for controlling air environments. The invention finds utility in particular in environmental life support systems for military vehicles and for nuclear shelters.

BACKGROUND TO THE INVENTION

Military vehicles must be able to operate effectively an the battlefield when under attack or threat of attack by nuclear, biological and chemical (NBC) weapons. To ensure that crew efficiency is maintained, collective protection is normally provided by creating a clean environment within the closed down vehicle crew space with filtered air. Under such conditions the crew can continue to operate without the encumbrance of protective gloves and respirators which greatly reduce crew operating effectiveness. Nonetheless, NBC suits would normally be worn-at all times due to the difficulty of donning them within the confined space of the vehicle.

For the vehicle to remain habitable and for the crew to operate as an efficient military unit, an efficient cooling system is necessary to meet the physiological requirements for vehicle habitation in a closed down vehicle with the crew wearing NBC protective suits. Systems providing collective NBC protection and cooling or heating of the crew cabin environment are referred to as "environmental life support systems".

Traditionally, environmental life support systems for military vehicles have been based upon activated charcoal filters, cooling being by vapour cycle refrigeration. Although providing a high level of-protection, activated charcoal filters are not regenerative and must be discarded and replaced following a chemical attack. The effective life of the filters is dependent on the concentration and nature of the challenge but may only be a few hours with some NBC agents.

This severely limits the effective operation of a vehicle on a battlefield when NBC weapons are deployed against them and creates high operational costs due to the logistics chain required to provide a regular supply of new filters to forward areas of the battlefield to support the vehicle fleet, and also the concomitant removal and disposal of contaminated filters. More recently systems have been developed based upon regenerative filtration in place of the non-reusable activated carbon elements.

The energy requirements for environmental life support systems has been a constraint on their adoption and deployment.

A number of proposals have been made to provide systems utilizing pressure swing adsorbtion (PSA) systems developed by PALL Corporation.

Pressure swing adsorbtion systems use filter beds filled with a sorbent material which adsorbs gases under pressure and desorbs gases once the pressure is removed. The system has two filter beds, one on stream and fed with contaminated air under pressure from which gases are removed. At the same time, the other off stream bed is regenerating and being purged with depressurised filtered air. On completion of the cycle, the role of each bed is reversed, the operation being controlled by an automatic sequence timer to provide continuous uninterrupted service. Industrial PSA systems have been shown to operate for many years without degradation of performance or air quality. PSA systems developed by PALL Corporation have been shown to be efficient in removing all known chemical agents. To demonstrate the suitability of PALL Corporation's PSA systems, a six month test was provided by the TNO Prins Maurits Laboratory in The Netherlands in 1988 testing a PSA using both simulants and live agents. The unit was challenged by a threat scenario developed in coordination with TNO and with the US Army's Edgewood Research Development and Engineering Centre and included nerve, blood and blister agents as well as a carbon breaker unit. The unit removed all the chemical agents to below the detection-limits of the instrumentation and proved conclusively that PSA technology was a viable concept for NBC collective protection systems. Further tests were carried out by Battelle Memorial Institute in 1991 at the behest of the US Air Force testing a full scale pressure swing adsorber.

A number of proposals for environmental life support systems using PSA have appeared, as, a consequence, in the patent literature.

U.S. Pat. No. 4,732,579, Veltman et al assigned to FMC Corporation, proposes a system and method for providing a continuous supply of clean air at a desired temperature to the crew members of a combat vehicle. The contaminated air is said to be initially compressed by energy received from the exhaust gases from a combustion power unit of the vehicle, the initially compressed air being cooled to increase its density and then compressed and cooled a second time before being passed through a pressure swing adsorbent system. Air from the PSA system is expanded and changed in temperature to provide clean air to personnel within the vehicle. Energy released from the air during expansion is used to compress the air in the secondary compressor. The off line PSA bed is purged with clean air from the an line bed which is expanded through an orifice to lower its pressure.

U.S. Pat. No. 4,769,051, Defranceso assigned to United Technologies Corporation, discloses an air conditioning system powered by a supply of compressed air. The compressed air passes to an air cycle machine having a compressor, a turbine and a load heat exchanger. Air from the compressor is communicated to the turbine which expands and cools the air before passing it to the load heat exchanger. A PSA system cleans air as it passes from the compressor to the turbine before expansion. Purge air for the PSA system is derived from the clean air exiting the load heat exchanger after first passing it through a regenerative heat exchanger which abstracts heat from the air as it passes from the compressor to the PSA system before passing on to the turbine.

U.S. Pat. No. 5,213,593, White et al assigned to PALL Corporation, proposes a PSA system which has first and second sorbing chambers, each of which includes first and second openings defining a gas flow path between them and a sorbent bed disposed in the gas flow path and having a sorption inlet region near the first opening, and a heater positioned near the sorption inlet region. The heaters are operated from an external energy source. A valve arrangement interconnects an intake, an exhaust and the first openings of the first and second sorbing chambers and interconnects an outlet with the second openings of the first and second sorbing chambers. Gas is directed through one sorbing chamber to the outlet. At the same time a portion of the outlet gas is directed through the other sorbing chamber to the exhaust. Energy from the external energy source is coupled to the heater of the other sorbing chamber to heat the sorption inlet region of the other sorbing chamber as the outlet gas flows through the sorption inlet region. The controller is adapted to cycle between the first and second sorbing chambers according to a NEMA cycle length of less than about five minutes. One sorbent bed sorbs at least a portion of contaminant from the gas and is heated by the heat of adsorption and the other sorbent bed is regenerated using both the energy supplied by the heater and the heat of adsorption.

OBJECT OF THE INVENTION

The present invention has arisen from our work seeking to make more efficient use of the energy in the system and in particular to enable a PSA system to operate under the most efficient operating conditions.

SUMMARY OF THE INVENTION

In accordance with one aspect of this invention, we provide a method for providing clean air conditioned air to an environment, the air being derived from a source of compressed air which is communicated to an air cycle machine having a compressor, a turbine and a load heat exchanger. Air is pressurised by the compressor and communicated to the turbine which expands and cools the air before it is communicated to the load heat exchanger. Contaminants are removed from the air by passing it from the compressor to the turbine via a pressure swing adsorbtion system of the kind comprising two filter beds, one on stream and fed with the contaminated air and the other off stream and being purged with purge air. The system being cycled to reverse the role of each bed periodically. Purge air is derived from air expanded by the turbine and passed through the load heat exchanger, the purge air being heated before entering the pressure swing adsorbtion apparatus by heat exchange with clean air passing from the pressure swing adsorption apparatus to the turbine.

Where no source of high pressure air is readily available, a first stage compressor, suitably with a cyclone filter inlet, is provided as part of the system. Preferably the air compressed by this first stage compressor and/or air compressed by the air cycle machine compressor will pass through an-ambient air cooled heat exchanger before proceeding to the next stage of the system. When employed, the first stage compressor is preferably as described below.

In a second and alternative aspect of the present invention, we provide a method of providing clean air at a desired temperature to an environment, the method comprising compressing incoming air possibly contaminated with nuclear, biological and chemical contaminants; cooling the compressed air in a first heat exchanger; compressing cooled air from the first heat exchanger in a secondary compressor; cooling compressed air from the secondary compressor in a secondary heat exchanger; directing cooled air from the secondary heat exchanger through a regenerative pressure swing adsorbtion system for providing clean output air with the contaminants removed therefrom; expanding the cleaned air in a turbine coupled to the secondary compressor, whereby to recover energy from the cleaned air to drive the secondary compressor; utilising expanded cleaned air from the turbine to condition air in said environment; and purging the regenerative pressure swing adsorbtion system with air derived from the expanded clean air, the purging air being warmed before being passed to the regenerative pressure swing adsorbtion system by heat exchange with cleaned air exiting the regenerative pressure swing adsorbtion system, whereby both to cool such cleaned air prior to expansion in the turbine and to pass purging air to the regenerative pressure swing adsorbtion system for more efficient operation thereof.

Pressure swing adsorbtion systems require that the purge air be depressurised. If, as in the systems of the present invention, this purge air is derived by expanding air through the turbine of the cold air unit, and then warming it through a recuperator by heat exchange as described above, temperature control can be achieved without additional energy being required.

The first stage air compression is suitably achieved by a radial turbo compressor, or a compressor of another suitable type, driven through a gearbox. The compressor assembly may be driven from the crankshaft of an auxiliary power unit, or by an hydraulic or high voltage electric motor, the power for which may be derived either from an auxiliary power unit or from the vehicle main engine. Suitably the compressor will draw air in through a cyclone filter. Such a compressor necessarily produces waste heat. We have found that this waste heat can be efficiently used in the system by using it to additionally heat the purge air to provide increased purging efficiency. Thus, in the most preferred arrangement, heating of the purge air is achieved in two stages. Firstly, as noted above, the purge air derived from the cleaned air expanded through the turbine passes through a recuperator which cools air from the on line filter of the pressure swing adsorbtion system as it passes to the turbine and is thereby itself warmed. Additionally, this warmed purge air is heated by using waste energy from the primary compression. The waste energy may be derived from the compressor drive, for example in the form of hot oil from the compressor gearbox or engine lubricating system, hydraulic fluid, or engine hot water, or simply directly from the heat of compression.

The pressure swing adsorbtion system will preferably include, in addition to its gas adsorbent beds, and upstream thereof, water separators to remove free moisture in the air following compression in the air cycle machine and also a high efficiency particulate filter to remove fine dust particles and biological agents.

In a further alternative aspect thereof, the invention provides in a combined pressure swing adsorbtion and air cycle system adapted to provide clean air at a desired temperature to an environment essentially free of nuclear, biological and chemical contaminants, use of waste heat to heat air for purging of apparatus used in said system for pressure swing adsorbtion, said waste heat being derived from a step of primary compression of incoming air.

The invention is hereinafter more particularly described by way of example only with reference to the accompanying drawings.

DESCRIPTION OF THE PREFERRED EMBODIMENTS

Figure 1:
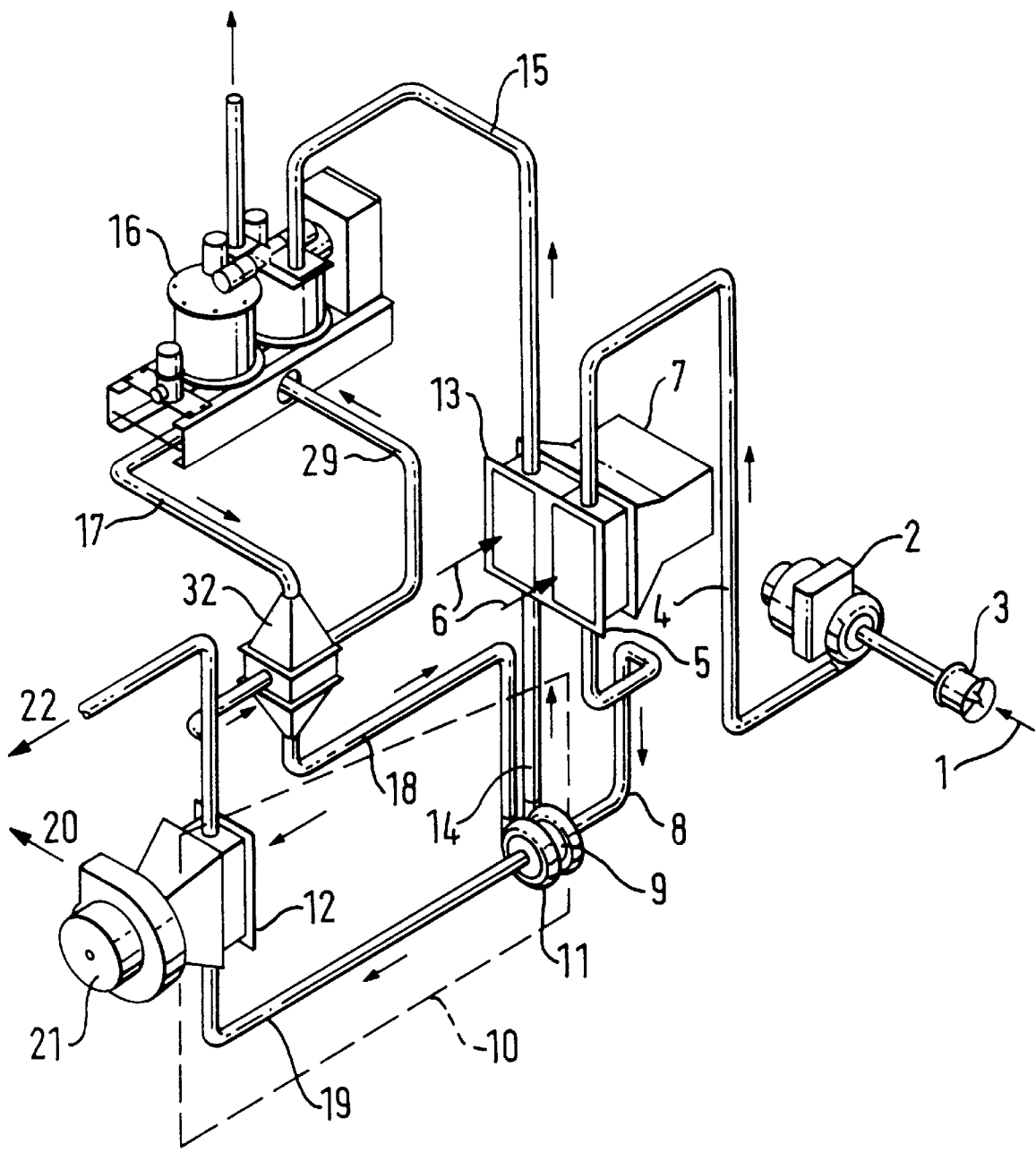
FIG. 1 shows a somewhat schematic circuit drawing for a first system constructed in accordance with the present invention for providing clean air conditioned air to an environment.

Referring first to FIG. 1 which illustrates schematically a typical embodiment of our basic system for use in circumstances where a readily available source of compressed air is not already present, in this system, input air 1 to a primary compressor 2 passes through a cyclone filter 3 which will remove gross contaminants. The compressor 2 is suitably a radial turbo compressor or another suitable compressor type, if necessary driven through a gearbox. The compressor assembly is driven by a suitable power source (not shown in FIG. 1), for example, from the crankshaft of an auxiliary engine, or by an hydraulic or electric motor, in a manner that will be known and well understood to any mechanical engineer. The compressor or an hydraulic or electric motor therefor may be powered by an auxiliary power unit or from the vehicle main engine. Compressed air from the primary compressor 2 passes along line 4 to a primary heat exchanger 5 cooled by ambient air 6 for which appropriate ducting 7 is provided in a manner known per se. The cooled compressed air received from the primary heat exchanger 5 passes along the line 8 to compressor 9 of an air cycle machine 10 comprising the compressor 9, a cooperating turbine 11 and load heat exchanger 12. A secondary compression is performed in compressor 9 on the cooled compressed air received from the primary heat exchanger 5 along line 8. Following secondary compression the air is cooled in a secondary heat exchanger 13 also cooled by ambient air 6, the secondary heat exchanger 13 being linked to compressor 9 by a line 14. The cooled and compressed air exiting from secondary heat exchanger 13 passes along line 15 to a regenerative pressure swing adsorbtion (PSA) system 16 where it is cleaned before passing to the turbine 11 along lines 17, 18. The cleaned air from the PSA system 16 is expanded in turbine 11 before passing along line 19 to load heat exchanger 12. The energy generated by expansion in turbine 11 drives compressor 9. As a result of expansion, the air is cooled. Cold air passing through the load heat exchanger 12 cools air 20 from the crew cabin compartment environment which is recirculated by means of a fan 21. Air which exits the load heat exchanger 12 is in part discharged into the crew cabin compartment to provide breathable fresh air 22 and the necessary collective protection, vehicle overpressure being controlled by a pressure relief valve.

Figure 2:
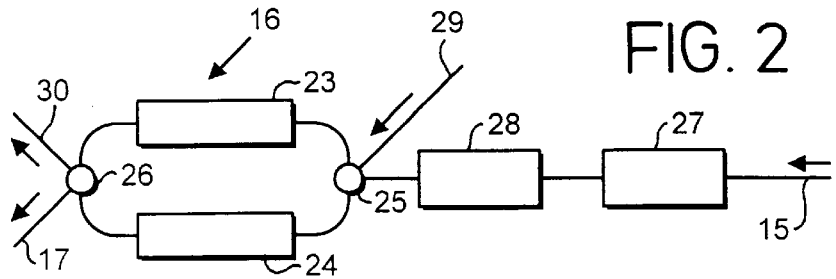
FIG. 2 is a generally schematic drawing of the pressure swing adsorbtion system of the embodiment of FIG. 1.

FIG. 2 illustrates schematically the pressure swing adsorbtion system 16. The system comprises two filter beds 23 and 24 which are identical. Each is filled with a sorbent material which adsorbs gases under pressure and desorbs gases once the pressure is removed. The system is controlled by input valving 25 and outlet valving 26 so that at any one time one of the two beds 23, 24 will be coupled to inlet line 15 via water separator 27 and particulate filter 28 and to outlet line 17 while the other is connected to purge line 29 and to purge air exhaust line 30 to atmosphere. Water separator 27 removes any water from the cooled compressed air in line 15 and filter 28 is a high efficiency particulate filter for the removal of fine dust particles and biological agents.

Purge air for line 29 is derived from clean air which has been expanded through turbine 11 and has passed through the load heat exchanger 12 and so has become slightly warmed. It is further warmed by passing through recuperator 32 which provides indirect heat exchange with clean air exiting the PSA system 16 along line 17. As a result of the inclusion of the regenerator 32 in the system, purging air is warmed before being passed to the PSA system 16 and at the same time, clean air from the PSA system is cooled prior to expansion in the turbine 11. We have found that warming the purge air in this way enhances the efficiency of the PSA system, without requiring a separate source of energy. The recuperator simply uses heat already present in the system. As a result, the basic system illustrated in FIG. 1 is already quite energy efficient. Nevertheless, as explained in more detail below, this energy efficiency can be further improved in the systems described with reference to FIG. 3.

The components of the basic system illustrated in FIG. 1 are all readily available and/or are readily capable of being If produced by a man of ordinary skills in the engineering arts. The PSA adsorbtion system is available as a ready made product from PALL Corporation, East Hills, N.Y., USA.

Figure 3A:
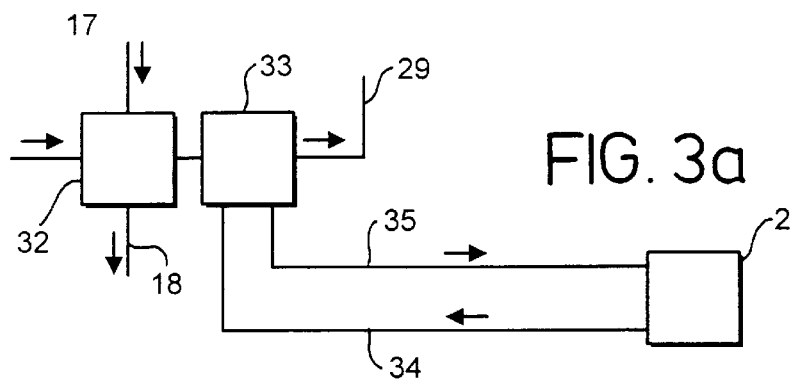
FIG. 3 illustrates the most preferred arrangement in which waste heat from the compressor is utilised to additionally heat the purge air, FIGS. 3a, 3b and 3c showing three different ways of utilising this waste heat.
Figure 3B:
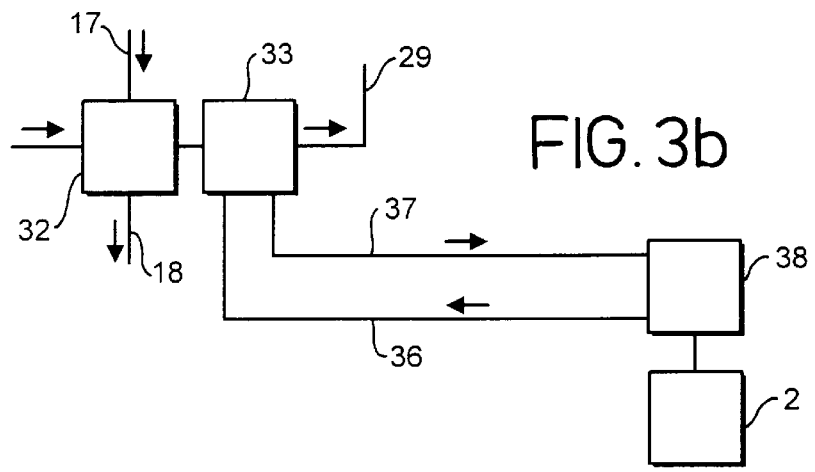
Figure 3C:
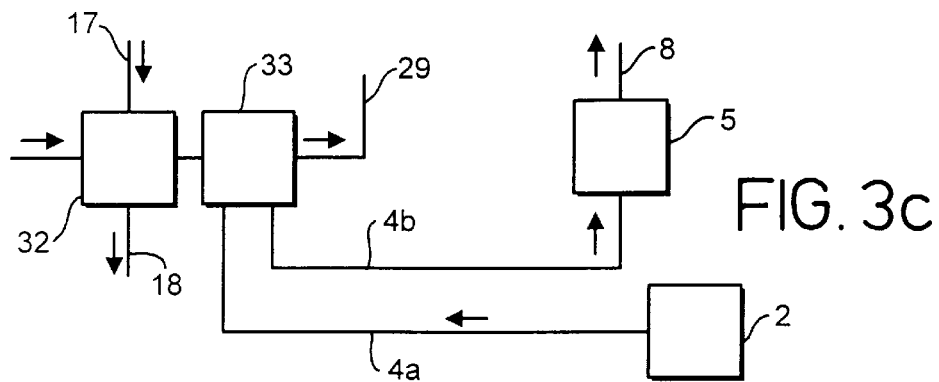
Figure 3:
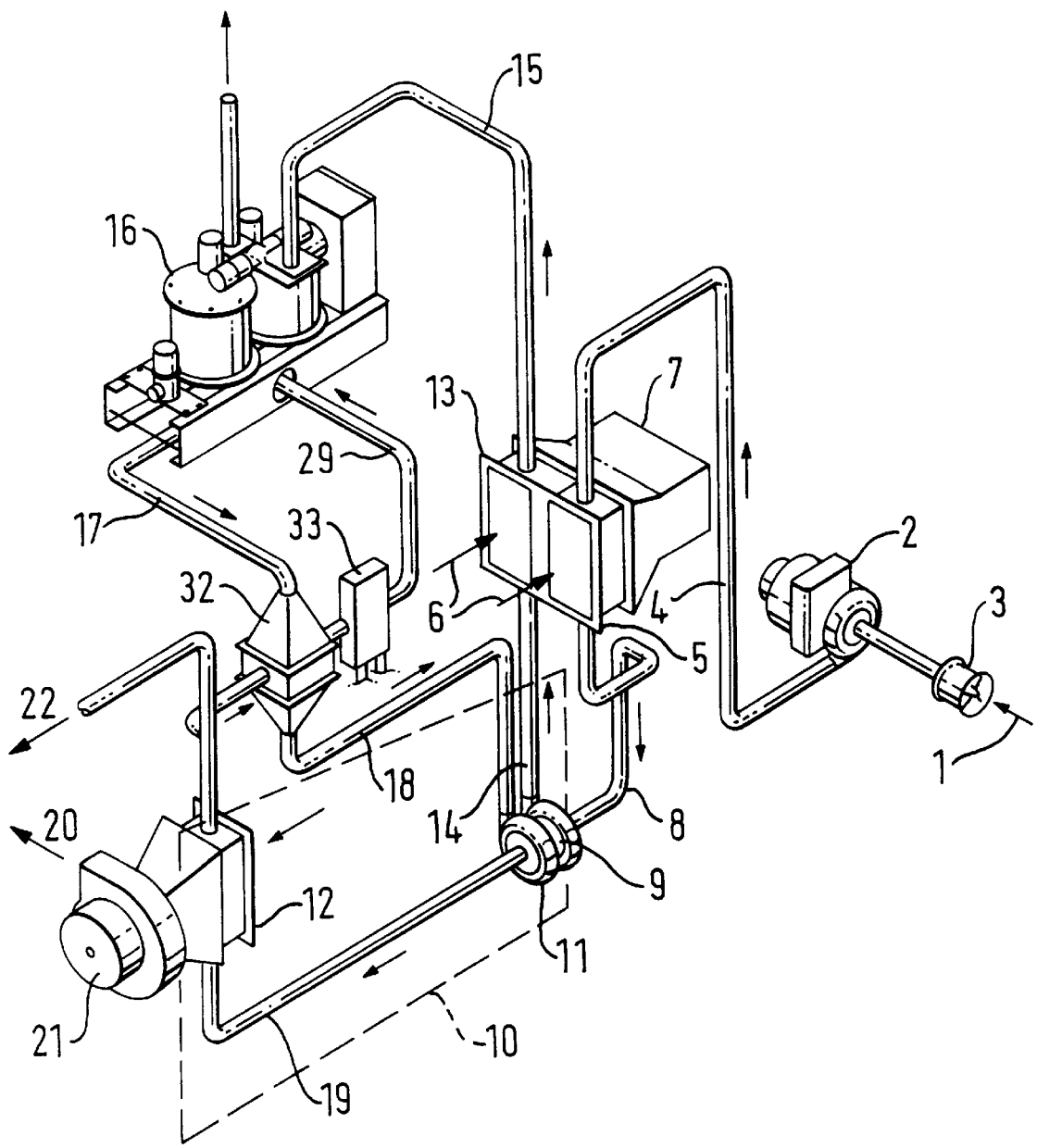

The arrangement of FIG. 3 is the same as that illustrated in FIG. 1, apart from the addition of an auxiliary heat exchanger 33 mounted at the outlet side of recuperator 32 in purge line 29 and which is used to heat the purge air after it exits the recuperator 32.

FIGS. 3a, 3b and 3c show three different ways in which heat exchanger 33 may be effectively coupled to use waste heat arising from the primary compression. In thy arrangement of FIG. 3a, lines 34 and 35 are coupled between heat exchanger 33 and the drive to compressor 2 to pass hot hydraulic fluid or lubricating oil from the compressor drive to heat exchanger 33 and back to the compressor drive.

In the alternative arrangement of FIG. 3b, lines 36 and 37 are coupled to an auxiliary power unit 38, here in the form of an engine which drives the compressor 2. Hot cooling water from engine 38 passes along line 36 to heat exchanger 33 and then back to the engine 38 along line 37.

Finally, in the arrangement of FIG. 3c, the heat of compression created by compressor 2 is effectively used in heat exchanger 33. In place of line 4 simply connecting the compressor to primary heat exchanger 5 to cool the compressed air, lines 4a and 4b connect compressor 2 to heat exchanger 5 via heat exchanger 33.

As will be appreciated, in all three of these arrangements, the system is utilising heat which otherwise merely appears as waste energy. We have found that for most efficient operation of the PSA filter system 16, it is important for the temperature of the off line filter to remain at the same level as that in the on line filter. In addition, we have found that significantly higher purge air temperatures are required to ensure complete desorbtion from both PSA beds on completion of a mission during which the system has been in operation. Both these requirements are readily achievable with the system of FIG. 3 using any of the it three variants of FIGS. 3a, 3b or 3c. By doing so with waste heat, the system is very energy efficient.

In a variant of the FIG. 3 arrangement, not illustrated, the recuperator may be omitted, clean air from the PSA unit passing directly to the turbine 11, and the purge air being heated only by the heat exchanger 33.

In a further variant, also not illustrated, suitable for use when the vehicle is to be deployed in cold ambient conditions, an additional heat exchanger is inserted between turbine 11 and load heat exchanger 12 for the cabin air, this additional heat exchanger being coupled to employ waste heat from the primary compression in one of the ways described above, and not necessarily in the same way as for heat exchanger 33, thereby further enhancing the energy efficiency of the system.

I claim:

1. A method for providing clean air conditioned air to an environment, the air being derived from a source of compressed air which is communicated to an air cycle machine having a compressor, a turbine and a load heat exchanger, the method comprising pressurizing air in the compressor, communicating pressurized air to the turbine to expand and cool the air and communicating expanded cooled air to the load heat exchanger, the method further comprising the step of removing contaminants from the air during the step of communicating air to the turbine by passing it from the compressor to the turbine via a pressure swing adsorbtion system comprising at least two filter beds, operated such that, at any one time, at least one such filter bed is on stream and fed with the contaminated air and at least one other such filter bed is off stream and being purged with de-pressurized clean air, the system being cycled to reverse the role of each filter bed periodically, and the de-pressurized clean air for purging being derived from air expanded by the turbine and passed through the load heat exchanger, the air for purging being heated by heat exchange with clean air passing from the pressure swing adsorbtion system to the turbine before entering the pressure swing adsorbtion system to purge it.

2. A method according to claim 1, wherein the source of compressed air comprises a first stage compressor, and wherein both air compressed by the first stage compressor and air compressed by the air cycle machine compressor is cooled by heat exchange with ambient air.

3. In a method of providing clean air at a desired temperature to an environment by the use of a pressure swing adsorbtion system for removing potential nuclear, biological and chemical contaminants from air, the system utilizing at least two filter beds, each filled with a sorbent material which adsorbs gases under pressure and desorbs gases once the pressure is removed, the system being arranged so that at any one time at least one said filter bed is on stream and fed with potentially contaminated air under pressure, while at the same time, at least one other said filter bed is off stream and regenerating by being purged with de-pressurized clean air, the pressure swing adsorbtion apparatus being coupled to an air cycle machine comprising a compressor and a turbine coupled to the compressor and adapted to drive said compressor, said compressor being adapted to receive compressed air from a primary compressor and to pass such air after secondary compression in the compressor to the pressure swing adsorbtion apparatus and the turbine being adapted to receive cleaned air from the pressure swing adsorbtion apparatus and to expand and cool such air, the air so cooled being passed to a load heat exchanger, wherein de-pressurized clean air for purging the pressure swing adsorbtion apparatus is derived from expanded clean air on the outlet side of the turbine and is heated before passing to the pressure swing adsorbtion apparatus to purge the off line filter bed by heat exchange with fluid circulating in the system, said fluid comprising one or more of clean air passing from the pressure swing adsorbtion apparatus to the turbine, cooling liquid heated by waste heat generated in the primary compressor, and cooling liquid heated by waste heat generated in a power unit driving the primary compressor.

4. A method of providing clean air at a desired temperature to an environment, the method comprising:
compressing incoming air;
cooling the compressed air in a first heat exchanger;
compressing cooled air from the first heat exchanger in a secondary compressor;
cooling compressed air from the secondary compressor in a secondary heat exchanger;
directing cooled air from the secondary heat exchanger through a regenerative pressure swing adsorbtion system for providing clean output air with nuclear, biological and/or chemical contaminants removed therefrom;
expanding the cleaned air in a turbine coupled to the secondary compressor, thereby to recover energy from the cleaned air to drive the secondary compressor;
utilizing expanded cleaned air from the turbine to condition air in said environment; and
purging the regenerative pressure swing adsorbtion system with air derived form the expanded clean air, the purging air being warmed before being passed to the regenerative pressure swing adsorbtion system by heat exchange with clean air exiting the regenerative pressure swing adsorbtion system, thereby both to cool such cleaned air prior to expansion in the turbine and to pass purging air to the regenerative pressure swing adsorbtion system for more efficient operation thereof.

5. A method according to claim 4, wherein the warmed purging air is further heated by heat exchange with waste heat derived from the step of compressing said incoming air.

6. A method according to claim 5, wherein said waste heat is derived from one of the group comprising lubricating oil, hydraulic fluid and cooling fluid associated with a compressor providing said compressing of incoming air, lubricating oil, hydraulic fluid and cooling fluid associated with a power unit for said compressor providing said compressing of incoming air, and heat of compression of air compressed by said compressor providing said compressing of incoming air.

7. A method according to claim 5, wherein the pressure swing adsorbtion system comprises two filter beds, each filled with a sorbent material which adsorbs gases under pressure and desorbs gases once the pressure is removed, the system being arranged so that at any one time one said filter bed is on stream and fed with potentially contaminated air under pressure, while at the same time, the other filter bed is off stream and regenerating by being purged, wherein the purging air is heated to a temperature such that the off stream bed is maintained at the same temperature as the on stream bed.

8. A method of providing clean air at a desired temperature to an environment, the method comprising:
compressing incoming air;
cooling the compressed air in a first heat exchanger;
compressing cooled air from the first heat exchanger in a secondary compressor;
cooling compressed air from the secondary compressor in a secondary heat exchanger;
directing cooled air from the secondary heat exchanger through a regenerative pressure swing adsorbtion system for providing clean output air with nuclear, biological and/or chemical contaminants removed therefrom;
expanding the cleaned air in a turbine coupled to the secondary compressor, thereby to recover energy from the cleaned air to drive the secondary compressor;
utilizing expanded cleaned air from the turbine to condition air in said environment; and
purging the regenerative pressure swing adsorbtion system with air derived from the expanded clean air, the purging air being warmed by heat exchange with waste heat derived from the step of compressing said incoming air, said waste heat being derived from one of the group comprising lubricating oil, hydraulic fluid and cooling fluid associated with a compressor providing said compressing of incoming air, and lubricating oil, hydraulic fluid and cooling fluid associated with a power unit for a compressor providing said compressing of incoming air.

9. A method according to claim 8, wherein the pressure swing adsorbtion system comprises at least two filter beds, each filled with a sorbent material which adsorbs gases under pressure and desorbs gases once the pressure is removed, the system being arranged so that at any one time at least one said filter bed is on stream and fed with potentially contaminated air under pressure, while at the same time, at least one other said filter bed is off stream and regenerating by being purged, wherein the purging air is heated to a temperature such that the off stream bed is maintained at the same temperature as the on stream bed.

10. Apparatus for providing clean air conditioned air to an environment, the air being derived from a source of compressed air, the apparatus comprising:

an air cycle machine having a compressor, a turbine and a load heat exchanger,
the compressor being adapted to receive air from the source of compressed air and to communicate compressed air to the turbine,
the turbine being adapted to expand and cool air received before communication such air to the load heat exchanger;

a pressure swing adsorbtion system,
the compressor and turbine being coupled via said pressure swing adsorbtion system for removing contaminants from the air,
said pressure swing absorption system comprising two filter beds cyclable so that one is on stream and fed with contaminated air while the other is off stream and being purged with purge air, the system being cycled to reverse the role of each bed periodically,
the pressure swing adsorbtion system including a purge line coupled to the air cycle machine so as to derive purge air from air expanded by the turbine and passed through the load heat exchanger;

and a regenerative heat exchanger coupled to the purge line so as to heat purge air before such air enters the pressure swing adsorbtion system by heat exchange with clean air pressing from the pressure swing adsorbtion system to the turbine.

11. Apparatus according to claim 10, further comprising a first stage compressor coupled to the compressor of the air cycle machine to provide said source of compressed air, and drive means therefor, the drive means being selected from the group comprising an auxiliary power unit, a main engine of a vehicle in which said apparatus is mounted, an hydraulic motor powered by said auxiliary power unit or by said main engine, and an electric motor powered by said auxiliary power unit or by said main engine,
the drive means being optionally coupled to the first stage compressor via a gearbox.

* * * * *